United States Patent
Dolev

(10) Patent No.: US 7,808,911 B2
(45) Date of Patent: Oct. 5, 2010

(54) DYNAMIC FIREWALL FOR NSP NETWORKS

(75) Inventor: Shlomo Dolev, Omer (IL)

(73) Assignee: Deutsche Telekom AG, Bonn (DE)

( * ) Notice: Subject to any disclaimer, the term of this patent is extended or adjusted under 35 U.S.C. 154(b) by 99 days.

(21) Appl. No.: 12/031,741

(22) Filed: Feb. 15, 2008

(65) Prior Publication Data

US 2008/0212481 A1    Sep. 4, 2008

(30) Foreign Application Priority Data

Feb. 19, 2007    (IL)    ..................................... 181427

(51) Int. Cl.
*G01R 31/08* (2006.01)
(52) U.S. Cl. .................. 370/236; 370/231; 370/237; 709/238; 709/224; 709/245
(58) Field of Classification Search ................ 370/236, 370/230, 352, 328; 709/238, 203, 242
See application file for complete search history.

(56) References Cited

U.S. PATENT DOCUMENTS

| | | | |
|---|---|---|---|
| 6,925,493 B1 | 8/2005 | Barkan et al. | |
| 6,948,003 B1 | 9/2005 | Newman et al. | |
| 7,307,954 B1 * | 12/2007 | Strandberg et al. | 370/235 |
| 7,327,675 B1 * | 2/2008 | Goode | 370/230 |
| 7,356,596 B2 * | 4/2008 | Ramanujan et al. | 709/227 |
| 7,426,634 B2 * | 9/2008 | Jain | 713/151 |
| 7,577,737 B2 * | 8/2009 | Fawcus | 709/224 |
| 2003/0087629 A1 * | 5/2003 | Juitt et al. | 455/411 |
| 2004/0100972 A1 * | 5/2004 | Lumb et al. | 370/401 |
| 2004/0223500 A1 * | 11/2004 | Sanderson et al. | 370/395.53 |
| 2007/0058540 A1 * | 3/2007 | Kay | 370/230 |

* cited by examiner

*Primary Examiner*—Ricky Ngo
*Assistant Examiner*—Rasheed Gidado
(74) *Attorney, Agent, or Firm*—Roach Brown McCarthy & Gruber P.C.; Kevin D. McCarthy

(57) ABSTRACT

Method for protecting an NSP data network against data overflow, according to which the NSP data network is divided to a protected sub-network and an unprotected sub-network. Connectivity to external data networks is allowed through the unprotected sub-network via a set of predefined controlled data ports. A maximum available bandwidth that can be processed by a user is determined for each user and maximal sub-bandwidth is allocated for each router. Whenever the data packet flow intended to the user exceeds the sub-bandwidth at one of the routers, the excess packet flow is filtered.

8 Claims, 2 Drawing Sheets

DYNAMIC FIREWALL FOR NSP NETWORKS

CLAIM OF PRIORITY

This application claims priority to Israeli patent application number 181427, filed on Feb. 19, 2007.

FIELD OF THE INVENTION

The present invention relates to the field of network protection. More particularly, the invention relates to a novel dynamic firewall for protecting NSP networks from intrusions.

BACKGROUND OF THE INVENTION

A network service provider (NSP) is a company that provides backbone (i.e., a set of paths that local or regional networks connect to for long-distance interconnection via network nodes, which are the connection points) services to an Internet service provider (ISP). An ISP provides access to the Internet to most Web users by connecting to a regional ISP at an Internet Exchange (IX). The regional ISP connects to an NSP backbone. The NSP routes all data traffic and provides the infrastructure required for Internet connectivity. The NSP builds, maintains, and expands their infrastructure as Internet traffic demands. The ISP is responsible for its own network's customer services. These services are provided under the ISP's brand name rather than that of the NSP. An ISP has the equipment and the telecommunication line access required to have a point-of-presence on the Internet for the geographic area served. The larger (regional) ISPs have their own high-speed leased lines so that they are less dependent on the telecommunication providers and can provide better service to their customers.

Security is one of the main issues that must be provided by modern NSPs. Conventional solutions, such as Velocity Networks Velocity Networks (Hawthorne, Calif., U.S.A.) provide centrally managed firewall services for ensuring that enterprises' data is kept secure by monitoring their firewall. However, in order not to introduce a bottleneck in data traffic, such solution requires operation in very high data rate and therefore is not feasible for high throughput data rates.

U.S. Pat. No. 6,925,493 (Barkan et al.) discloses a system for automatically monitoring and managing Service Level Agreements (SLAB) on behalf of Service Providers (such as Application Service providers). The system enables Application Service providers to set up customized Service Level Agreements with customers, and monitor, modify and control aspects of these agreements, using a formula driven language that translates Service Level Agreement details into commands. As such these details can be tracked and processed to produce detailed reports and summaries.

U.S. Pat. No. 6,948,003 (Newman et al.) discloses a system that allows a service provider to provide Intranet services remotely by assigning private virtual servers to customers. Each customer addresses transmissions to one or more private virtual servers using private addresses from the customer's private Intranet. Customers exchange privately-addressed transmissions with the service provider using tunnels to traverse the local or regional network connecting the customer with the service provider. The service provider routes the transmissions to the relevant private virtual server belonging to the customer that sent the transmission, as well as privately-addressed transmissions back to individual customers using tunnels.

All the methods described above have not yet provided satisfactory solutions to the problem of providing an effective solution for security management in NSP networks.

It is therefore an object of the present invention to provide a method for providing an effective security management in NSP networks.

It is another object of the present invention to provide a method for providing a dynamic firewall for NSP networks that prevents intrusions into these networks.

It is a further object of the present invention to provide a method for providing a dynamic firewall for NSP networks that blocks intrusions from propagating even after intrusion.

Other objects and advantages of the invention will become apparent as the description proceeds.

SUMMARY OF THE INVENTION

The present invention is directed to a method for protecting an NSP data network that provides connectivity to users, against data overflow. The NSP data network is optionally divided to a first sub-network which is a protected region within the NSP data network and a second unprotected sub-network within the NSP data network, such that connectivity to external data networks, such as the internet is allowed through the second sub-network via a set of predefined controlled data ports. Each user is connected to the first region via a proxy router and to the second region via gateway routers that are connected to the proxy router through interconnected intermediating routers and to the second region via the set of controlled data ports. For each user a maximum available bandwidth that can be processed by this user is determined and maximal sub-bandwidth is allocated for each router, such that the sub-bandwidth is equal to, or smaller than, the bandwidth. Whenever the data packet flow intended to the user exceeds the sub-bandwidth at one of the routers, the excess packet flow is filtered according to predetermined criteria defined by the user. A report about the filtered packets is sent to the user within a predetermined period after the filtering begins and the user is allowed to change the criteria and/or the bandwidth in real time. Otherwise, the data packet flow is passed from each router to the next router until the proxy router.

The proxy router may be the successor router and the remaining routers are its predecessors. The maximal sub-bandwidth for each predecessor router may be equal to the maximum available bandwidth or to the maximum available bandwidth, divided by the number of intermediating routers.

Filtering may be performed by the proxy router and all intermediating routers or by one or more intermediating routers.

Bandwidth allocation may be performed recursively by each router, to its predecessor router.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

According to the present invention, a dynamic firewall service is provided to an NSP network. This firewall is installed at the user's LAN or other local network, as well as at routers using OSPF (Open Shortest Path First, which is a router protocol used within larger networks, such as NSP networks, according to which a host that obtains a change to a routing table or detects a change in the network immediately multicasts the information about the part that has changed to all other hosts in the network so that all will have the same routing table information) boundaries. Unlike conventional firewalls of LANs, such protection architecture eliminates the need to analyze extremely high data throughput at the gateway to the NSP network.

Figure 2:
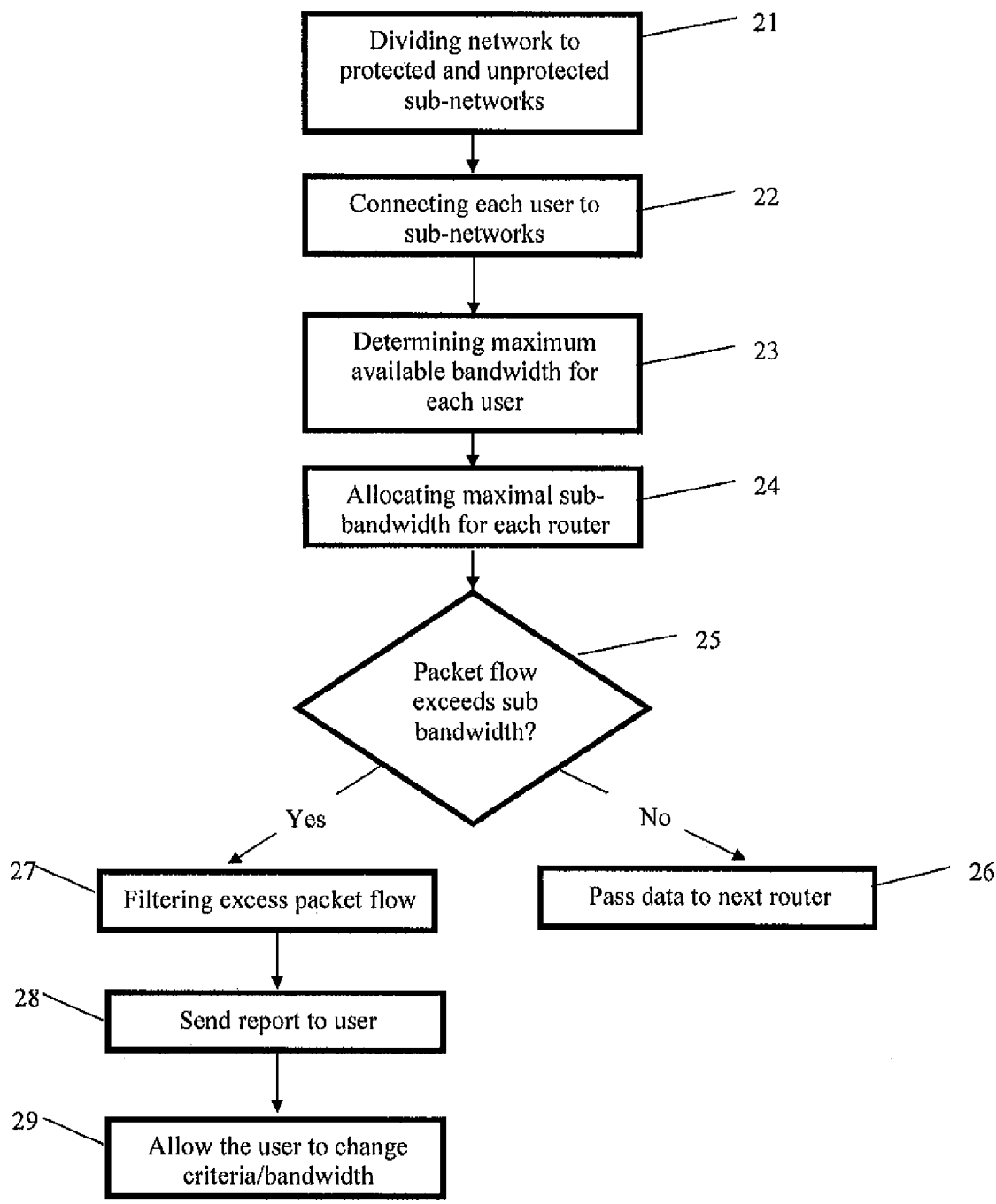
FIG. 2 is a flow chart describing the method for protecting the NSP data network against data overflow.

FIG. 2 is a flow chart describing the method for protecting the NSP data network against data overflow. The first step is dividing to a first sub-network which is a protected region within the NSP data network and a second unprotected sub-network within the NSP data network (step 21), such that connectivity to external data networks, such as the internet is allowed through the second sub-network via a set of pre-defined controlled data ports. Each user is connected to the first region via a proxy router and to the second region via gateway routers (step 22); the gateway routers are connected to the proxy router through interconnected intermediating routers and to the second region via the set of controlled data ports. For each user a maximum available bandwidth that can be processed by this user is determined (step 23) and maximal sub-bandwidth is allocated for each router (step 24), such that the sub-bandwidth is equal to, or smaller than, the bandwidth. Whenever the data packet flow intended to the user exceeds the sub-bandwidth at one of the routers (decision step 25), the excess packet flow is filtered according to predetermined criteria defined by the user (step 27). A report about the filtered packets is sent to the user (step 28) within a predetermined period after the filtering begins and the user is allowed to change the criteria and/or the bandwidth in real time (step 29). Otherwise, the data packet flow is passed from each router to the next router until the proxy router (step 26).

Figure 1:
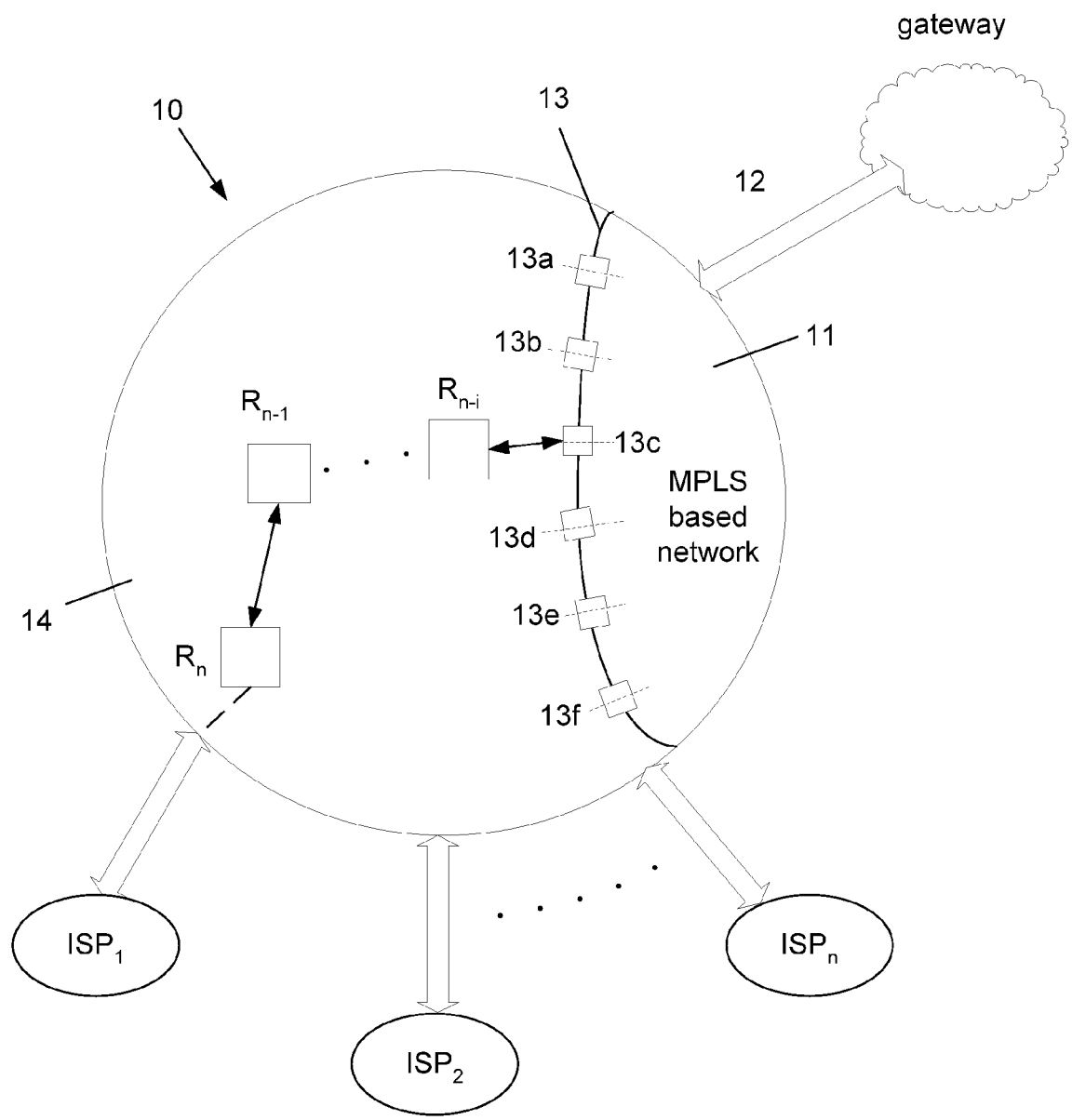
FIG. 1 schematically illustrates the implementation of a dynamic distributed firewall within an NSP network, according to a preferred embodiment of the invention.

FIG. 1 schematically illustrates the implementation of a dynamic distributed firewall within an NSP network, according to a preferred embodiment of the invention. The NSP network 10 is actually an MPLS (Multiprotocol Label Switching)-based network 11 that allows network operators flexibility to divert and route traffic around link failures, congestion, and bottlenecks, so as to allow ISPs to better manage different kinds of data streams based on priority and service plan. When packets enter a MPLS-based network, the Label Edge Routers (LERs) within the NSP network give them a label (identifier). These labels contain information based on the routing table entry (i.e., destination, bandwidth, delay, and other metrics), as well as the source IP address for classification. Once classification is complete and mapped, different packets are assigned to corresponding Labeled Switch Paths (LSPs), where Label Switch Routers (LSRs) place outgoing labels on the packets. With these LSPs, network operators can divert and route traffic based on data-stream type and Internet-access customer.

Data traffic is exchanged with the internet through a data channel 12 and a gateway, which is not protected. A distributed firewall 13 that can be dynamically configured online is established within the NSP network 10, such that the NSP network 10 is divided into two regions: MPLS-based region 11 and a secured region 14. A group of ISPs: $ISP_1, \ldots, ISP_n$ are connected to the NSP network 10 through the secured region 14 via a set of a predetermined number of inputs 13a to 13f which are controlled by the firewall management. A bandwidth $B_i$ is allocated to each certain $ISP_i$ that periodically transmits data to the NSP's firewall management regarding the maximal available bandwidth $B_{imax}$ that $ISP_i$ can process. The firewall filters incoming packets' flow for each $ISP_i$ according to filtering rules and criteria defined by the $ISP_i$, as well as its requirements regarding filtering implementation. A summary regarding filtered incoming packets' is sent to each $ISP_i$, who may choose to adjust his filtering criteria. Such criteria may be their source IP address, TCP port No., allocated URL etc. In addition, firewall 13 provides conventional security services, such as preventing IP address spoofing (IP address forgery by altering packet headers to lead to a situation where a legitimate host appears to be the source), spam and Distributed Denial of Service (DDoS) attacks.

At each router within the secured region 14, firewall 13 limits data traffic intended to $ISP_i$, not to exceed the maximum available bandwidth B. The NSP network's management also filters the excess data traffic at each controlled input $13_i$ (distributed filtering). This way, non-relevant or risky data cannot penetrate into the destination $ISP_i$'s network and the ability of each $ISP_i$ to control data flow congestions is guaranteed. In addition, the management layer of firewall 13 periodically sends a report to each $ISP_i$ about the excess data traffic that has been intended to that $ISP_i$ and was filtered. Normally, no filtering is performed as long as the data traffic that has been intended to that $ISP_i$ does not exceed $B_i$.

According to a preferred embodiment of the invention, bandwidth allocation is performed in the backward direction, from $ISP_i$ proxy (closest) router $R_n$ via the subsequent intermediate downstream routers $R_{n-1}, R_{n-2}, \ldots$ until the NSP's gateway router $R_{n-i}$. In this example, regular datagram routing procedure is assumed, as defined by TCP/IP protocol. Optimal routing may be performed, for example, according to the well known shortest path algorithm. In this case, proxy router $R_n$ starts bandwidth allocation to its predecessors (downstream routers) $R_{n-1}, R_{n-2}, \ldots, R_{n-i}$, according to the NSP network's directed graph. This bandwidth allocation procedure is performed recursively for each $ISP_i$ until it is terminated at one of the NSp's gateway routers. If the packet rate at any router within the NSP network exceeds the maximal bandwidth which can be processed by that router filtering is started, and a report regarding the discarded data packets is sent by that router to the destined ISP.

According to one method for bandwidth allocation, if the bandwidth available for $ISP_i$ is M Mb/sec, each NSP's proxy router $R_n$ equally allocates bandwidth to its downstream routers $R_{n-1}, R_{n-2}, \ldots, R_{n-i}$, such that a bandwidth of M/i Mb/sec is allocated to each downstream router. Then, each of the downstream routers $R_{n-1}, R_{n-2}, \ldots, R_{n-i}$ also reserves equal portion to its j corresponding predecessors, such that each predecessor of router $R_{n-i}$ receives a bandwidth portion of M/i·j. According to this example, whenever a router Rx with a maximum bandwidth $M_x$ (Mb/sec) receives data packets from its predecessor $R_{x-1}$ with packet velocity $v > M_x$, a filtering process begins for the excess $v - M_x$ bits and a report about the filtered data is sent to the corresponding ISP within a predetermined time t after filtering. Otherwise, the complete packet flow is passed to the next router $R_{x+1}$. If router Rx is connected to I downstream routers, then a bandwidth of M/I Mb/sec is allocated to each router $R_{x-1-I}$ (i=0, 1, . . . I).

According to an alternative method for bandwidth allocation, if router Rx is connected to I downstream routers, then a bandwidth of M Mb/sec is allocated to each router $R_{x-1-I}$ (i=0, 1, . . . I). This way, the NSP's proxy router Rn allocates the complete maximum available bandwidth to reach of its predecessor routers $R_{n-1}, R_{n-2}, \ldots, R_{n-i}$. This way, the maximum available bandwidth M (Mb/sec) is completely exploited by each predecessor router. According to this alternative method, filtering is performed by all routers, including the NSP's proxy router $R_n$.

This way, filtering of excess data traffic start immediately after a risk for traffic overflow arises, there by allowing prompt traffic flow and congestion control to take over.

The above examples and description have of course been provided only for the purpose of illustration, and are not intended to limit the invention in any way. As will be appreciated by the skilled person, the invention can be carried out in a great variety of ways, employing more than one technique from those described above, such as implementing other known bandwidth allocation procedures by the NSP's network management layer, all without exceeding the scope of the invention.

The invention claimed is:

1. A method for protecting a Network Service Provider (NSP) data network that provides connectivity to users, against data overflow, comprising:
   a) dividing said NSP data network to a first sub-network being a protected region within said NSP data network and a second unprotected sub-network within said NSP data network, such that connectivity to external data networks is allowed through said second sub-network via a set of predefined controlled data ports;
   b) connecting each user to said first sub-network via a proxy router;
   c) connecting each user to said second sub-network via one or more gateway routers that are connected to said proxy router through interconnected intermediating routers and to said second sub-network via said set of controlled data ports;
   d) for each user, determining a maximum available bandwidth that can be processed by said user;
   e) allocating maximal sub-bandwidth for each router, such that said maximal sub-bandwidth is equal to, or smaller than, said maximal available bandwidth of each user;
   whenever the data packet flow intended to said user exceeds said sub-bandwidth at one of said routers:
   f) filtering the excess packet flow according to predetermined criteria defined by said user;
   g) sending to said user a report about the filtered packets within a predetermined period after said filtering begins;
   h) allowing said user to change said criteria and/or said bandwidth in real time;
   otherwise,
   i) passing said data packet flow from each router to the next router until the proxy router.

2. The method according to claim 1, wherein the proxy router is the successor router and the remaining routers are its predecessors.

3. The method according to claim 2, wherein the maximal sub-bandwidth for each predecessor router is equal to the maximum available bandwidth.

4. The method according to claim 2, wherein the maximal sub-bandwidth for each predecessor router is equal to the maximum available bandwidth, divided by the number of intermediating routers.

5. The method according to claim 3, wherein filtering is performed by the proxy router and all intermediating routers.

6. The method according to claim 4, wherein filtering is performed by one or more intermediating routers.

7. The method according to claim 2, wherein the bandwidth allocation is performed recursively by each router, to its predecessor router.

8. The method according to claim 1, wherein the external data network is the internet.

* * * * *